(12) United States Patent
Liu

(10) Patent No.: US 11,400,837 B2
(45) Date of Patent: Aug. 2, 2022

(54) HANDLE ADJUSTING MECHANISM AND CHILD CARRIER

(71) Applicant: Wonderland Switzerland AG, Steinhausen (CH)

(72) Inventor: Wei-Huan Liu, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/003,954

(22) Filed: Aug. 26, 2020

(65) Prior Publication Data
US 2021/0146808 A1    May 20, 2021

(30) Foreign Application Priority Data

Nov. 15, 2019    (CN) .......................... 201921981659.4

(51) Int. Cl.
*B60N 2/28*     (2006.01)
*A47D 13/02*    (2006.01)

(52) U.S. Cl.
CPC ........... *B60N 2/2845* (2013.01); *A47D 13/02* (2013.01); *A47D 13/025* (2013.01); *B60N 2/28* (2013.01); *B60N 2/2842* (2013.01)

(58) Field of Classification Search
CPC .. B60N 2/2806; B60N 2/2812; B60N 2/2845; B60N 2/2848; B60N 2/2857; B60N 2/2875; A47D 13/02; A47D 13/025
(Continued)

(56) References Cited

U.S. PATENT DOCUMENTS

| 4,516,806 A | * | 5/1985 | McDonald ............. A47D 13/02 297/183.2 |
| 4,634,177 A | * | 1/1987 | Meeker ................ B60N 2/2854 297/256.13 |

(Continued)

FOREIGN PATENT DOCUMENTS

| CN | 104816751 A | 8/2015 |
| CN | 108099705 A | 6/2018 |

(Continued)

OTHER PUBLICATIONS

"International Search Report" dated Feb. 15, 2021 for International application No. PCT/EP2020/081666, International filing date Nov. 10, 2020.

*Primary Examiner* — Rodney B White
(74) *Attorney, Agent, or Firm* — Winston Hsu

(57) ABSTRACT

A handle adjusting mechanism for adjusting a handle relative to a carrier body pivotally connected to the handle, includes a locking component slidably disposed at a pivotal connection of the handle and the carrier body. The locking component includes a first locking portion and a second locking portion. The first locking portion is for engaging with the handle. The second locking portion is for engaging with the carrier body. The handle is restrained from pivoting relative to the carrier body when the locking component slides to an engaging position to engage the first locking portion with the handle and to engage the second locking portion with the carrier body. The handle is allowed to pivot relative to the carrier body when the locking component slides to a disengaging position to disengage the first locking portion from the handle and to disengage the second locking portion from the carrier body.

24 Claims, 9 Drawing Sheets

(58) Field of Classification Search
USPC ....... 297/183.1, 183.2, 183.3, 183.4, 216.11, 297/250.1–256.17
See application file for complete search history.

(56) References Cited

U.S. PATENT DOCUMENTS

| | | | | |
|---|---|---|---|---|
| 4,943,113 A * | 7/1990 | Meeker | ................ | B60N 2/2821 297/250.1 |
| 4,998,307 A * | 3/1991 | Cone | ................ | B60N 2/2806 297/183.2 |
| 5,011,221 A * | 4/1991 | Wise | ................ | A47D 1/002 297/183.3 X |
| 5,115,523 A * | 5/1992 | Cone | ................ | B60N 2/2806 297/256.13 |
| 5,244,292 A * | 9/1993 | Wise | ................ | A47D 13/025 297/183.3 X |
| 5,385,387 A * | 1/1995 | Kain | ................ | B60N 2/2806 297/183.3 |
| 5,567,008 A * | 10/1996 | Cone, II | ................ | B60N 2/2821 297/183.2 |
| 5,581,234 A * | 12/1996 | Emery | ................ | B60N 2/2821 297/250.1 |
| 5,658,044 A * | 8/1997 | Krevh | ................ | A47D 13/02 297/183.4 X |
| 5,660,430 A * | 8/1997 | Clarke | ................ | A47D 9/02 297/256.16 X |
| 5,806,924 A * | 9/1998 | Gonas | ................ | B60N 2/2821 297/216.11 |
| 5,915,787 A * | 6/1999 | Brookman | ................ | B60N 2/2806 297/256.13 |
| 5,971,479 A * | 10/1999 | Jacquemot | ................ | B60N 2/2821 297/250.1 |
| 6,017,088 A * | 1/2000 | Stephens | ................ | A47D 13/02 297/256.16 X |
| 6,053,573 A * | 4/2000 | Nakagawa | ................ | B60N 2/1615 297/250.1 |
| 6,145,927 A * | 11/2000 | Lo | ................ | A47D 13/025 297/183.3 |
| 6,220,662 B1 * | 4/2001 | Franco-Vila | ................ | B64D 11/062 297/256.13 |
| 6,318,807 B1 * | 11/2001 | Perego | ................ | B62B 7/142 297/256.16 X |
| 6,367,875 B1 * | 4/2002 | Bapst | ................ | A47D 13/02 297/183.2 X |
| 6,386,632 B1 * | 5/2002 | Goor | ................ | B60N 2/2806 297/183.2 |
| 6,409,205 B1 * | 6/2002 | Bapst | ................ | B62B 7/06 297/256.16 X |
| 6,428,099 B1 * | 8/2002 | Kain | ................ | B60N 2/2806 297/250.1 |
| 6,672,664 B2 * | 1/2004 | Yanaka | ................ | B60N 2/2806 297/256.16 |
| 7,163,265 B2 * | 1/2007 | Adachi | ................ | B60N 2/2806 297/250.1 |
| 7,246,853 B2 * | 7/2007 | Harcourt | ................ | B60N 2/2812 297/250.1 |
| 7,300,113 B2 * | 11/2007 | Baloga | ................ | B60N 2/2803 297/250.1 |
| 7,488,034 B2 * | 2/2009 | Ohren | ................ | B60N 2/2821 297/183.6 |
| 7,988,230 B2 * | 8/2011 | Heisey | ................ | B60N 2/2821 297/250.1 |
| 8,007,043 B1 * | 8/2011 | Vuong | ................ | B60N 2/2839 297/250.1 |
| 8,070,228 B2 * | 12/2011 | Karremans | ................ | B60N 2/2821 297/256.16 |
| 8,186,757 B2 * | 5/2012 | Duncan | ................ | B60N 2/2806 297/256.13 |
| 8,262,161 B2 * | 9/2012 | Fritz | ................ | B60N 2/2806 297/253 |
| 8,393,678 B2 * | 3/2013 | Keegan | ................ | B60N 2/2863 297/256.16 |
| 8,430,451 B1 * | 4/2013 | Heinz | ................ | B60N 2/5685 297/256.16 X |
| 8,434,821 B2 * | 5/2013 | Gibree | ................ | B60N 2/2806 297/250.1 |
| 8,550,555 B2 * | 10/2013 | Fritz | ................ | B60N 2/2863 297/253 |
| 8,845,022 B2 * | 9/2014 | Strong | ................ | B60N 2/75 297/256.16 |
| 8,998,312 B2 * | 4/2015 | Sellers | ................ | A47D 13/02 297/183.4 |
| 9,056,567 B2 * | 6/2015 | Wuerstl | ................ | A47D 13/025 |
| 9,371,017 B2 * | 6/2016 | Spence | ................ | B60N 2/2875 |
| 9,962,011 B1 | 5/2018 | Eyman | | |
| 10,299,609 B2 * | 5/2019 | Taylor | ................ | B60N 2/2881 |
| 10,737,593 B1 * | 8/2020 | Shellenberger | ....... | B60N 2/2806 |
| 2001/0004163 A1 * | 6/2001 | Yamazaki | ................ | B60N 2/286 297/256.16 |
| 2003/0015894 A1 * | 1/2003 | Bargery | ................ | B60N 2/2848 297/250.1 X |
| 2003/0164632 A1 * | 9/2003 | Sedlack | ................ | B62B 7/145 297/256.16 |
| 2005/0110318 A1 * | 5/2005 | Meeker | ................ | B60N 2/2812 297/256.16 |
| 2005/0127727 A1 * | 6/2005 | Gangadharan | ....... | B60N 2/2806 297/256.16 |
| 2006/0091709 A1 * | 5/2006 | Emmert | ................ | B60N 2/2878 297/256.16 |
| 2008/0018145 A1 * | 1/2008 | Tuckey | ................ | A47D 13/105 297/183.3 |
| 2011/0074194 A1 * | 3/2011 | Weber | ................ | B60N 2/286 297/256.13 |
| 2011/0089731 A1 * | 4/2011 | Gibree | ................ | B60N 2/2806 297/250.1 |
| 2011/0089732 A1 * | 4/2011 | Yang | ................ | B60N 2/2845 297/256.16 |
| 2011/0140491 A1 * | 6/2011 | Williams | ................ | B60N 2/2821 297/256.16 |
| 2011/0298259 A1 * | 12/2011 | Heisey | ................ | B60N 2/2845 297/256.16 |
| 2012/0013159 A1 * | 1/2012 | Williams | ................ | B60N 2/2821 297/256.16 |
| 2012/0013160 A1 * | 1/2012 | Williams | ................ | B60N 2/2875 297/256.16 |
| 2012/0181822 A1 * | 7/2012 | Williams | ................ | B60N 2/2863 297/256.16 X |
| 2012/0261961 A1 * | 10/2012 | Heisey | ................ | B60N 2/2848 297/256.16 |
| 2013/0009428 A1 | 1/2013 | Heisey | | |
| 2014/0008951 A1 * | 1/2014 | Spence | ................ | B60N 2/2845 297/250.1 |
| 2014/0361589 A1 * | 12/2014 | Hou | ................ | B60N 2/2821 297/256.16 |
| 2015/0183341 A1 * | 7/2015 | Carpenter | ............ | B60N 2/2803 297/256.16 |
| 2015/0257545 A1 * | 9/2015 | Heisey | ................ | B60N 2/2845 297/256.16 X |
| 2016/0200225 A1 * | 7/2016 | Van Der Veer | ...... | B60N 2/2812 297/256.16 |
| 2017/0065098 A1 * | 3/2017 | Taylor | ................ | B60N 2/2881 |

FOREIGN PATENT DOCUMENTS

| | | |
|---|---|---|
| CN | 109229197 A | 1/2019 |
| GB | 2485072 A | 5/2012 |
| TW | 201028317 A1 | 8/2010 |
| WO | 2010/119446 A2 | 10/2010 |

* cited by examiner

HANDLE ADJUSTING MECHANISM AND CHILD CARRIER

BACKGROUND OF THE INVENTION

1. Field of the Invention

The present invention relates to a child product, and more particularly, to a handle adjusting mechanism with simple structure and capability of positioning an angle of a handle relative to a carrier body firmly, and a child carrier therewith.

2. Description of the Prior Art

Child carriers, such as child baskets, are widely used in families with children. Currently, in order to improve applicability of the child carrier, the child carrier usually includes a handle adjusting mechanism for positioning a handle relative to a carrier body at different angles to allow a user to adjust an angle of the handle relative to the carrier body according to practical demands, which brings convenience in use.

However, the conventional handle adjusting mechanism usually has two independent locking mechanisms for locking the handle and the carrier body individually, which not only makes structure complicated but also causes poor operability. Furthermore, such configuration cannot balance torque when the handle and the carrier body are locked individually, which increases possibility of structural damage.

SUMMARY OF THE INVENTION

Therefore, it is an objective of the present invention to provide a handle adjusting mechanism with simple structure and capability of positioning an angle of a handle relative to a carrier body firmly, and a child carrier therewith.

In order to achieve the aforementioned objective, the present invention discloses a handle adjusting mechanism for adjusting a handle relative to a carrier body pivotally connected to the handle. The handle adjusting mechanism includes a locking component slidably disposed at a pivotal connection of the handle and the carrier body. The locking component includes a first locking portion and a second locking portion. The first locking portion is for engaging with the handle. The second locking portion is for engaging with the carrier body. The handle is restrained from pivoting relative to the carrier body when the locking component slides to an engaging position to engage the first locking portion with the handle and to engage the second locking portion with the carrier body, and the handle is allowed to pivot relative to the carrier body when the locking component slides to a disengaging position to disengage the first locking portion from the handle and to disengage the second locking portion from the carrier body.

According to an embodiment of the present invention, preferably, the handle adjusting mechanism further includes an operating component slidably disposed at the pivotal connection of the handle and the carrier body and for abutting against the locking component. The operating component slides to abut against the locking component to drive the locking component to slide to the engaging position or the disengaging position.

According to an embodiment of the present invention, preferably, a first inclined surface is formed on the operating component. A second inclined surface is formed on the locking component and for cooperating with the first inclined surface, and the operating component drives the locking component to slide to the engaging position or the disengaging position by cooperation of the first inclined surface and the second inclined surface.

According to an embodiment of the present invention, preferably, the locking component is disposed inside the pivotal connection of the handle and the carrier body. The operating component includes an abutting end and an operating end. The abutting end is located inside the pivotal connection of the handle and the carrier body and for abutting against the locking component, and the operating end protrudes out of the pivotal connection of the handle and the carrier body.

According to an embodiment of the present invention, preferably, the operating component and the locking component are slidably disposed on the handle, and the operating component and the locking component pivot relative to the carrier body synchronously along with a pivotal movement of the handle relative to the carrier body.

According to an embodiment of the present invention, preferably, the operating component is biased to slide away from the locking component.

According to an embodiment of the present invention, preferably, the handle adjusting mechanism further includes a resilient component compressibly disposed at the pivotal connection of the handle and the carrier body and abutting against the operating component, and the operating component is biased to slide away from the locking component by the resilient component.

According to an embodiment of the present invention, preferably, a pivoting shaft protrudes from the handle and is pivoted to the carrier body.

According to an embodiment of the present invention, preferably, a restraining hole is formed on the operating component. The pivoting shaft passes through the restraining hole, and a sliding movement of the operating component is restrained by cooperation of the pivoting shaft and the restraining hole.

According to an embodiment of the present invention, preferably, an installing hole is formed on the operating component and communicated with the restraining hole.

According to an embodiment of the present invention, preferably, the restraining hole is a elongated hole.

According to an embodiment of the present invention, preferably, the locking component is biased to slide to the engaging position.

According to an embodiment of the present invention, preferably, the handle adjusting mechanism further includes a recovering component compressibly disposed at the pivotal connection of the handle and the carrier body and abutting against the locking component, and the locking component is biased to slide to the engaging position by the recovering component.

According to an embodiment of the present invention, preferably, the locking component further includes a main body. The first locking portion protrudes from the main body, and a first locking slot is formed on the handle and for engaging with the first locking portion.

According to an embodiment of the present invention, preferably, the second locking portion protrudes from the main body. At least two second locking slots are formed on the carrier body and for engaging with the second locking portion, and the handle is positioned relative to the carrier body at different angles when the second locking portion slides to engage with different ones of the at least two second locking slots.

According to an embodiment of the present invention, preferably, the first locking portion and the second locking portion protrude from the main body along two opposite directions.

According to an embodiment of the present invention, preferably, a ring-shaped structure protrudes from a side of the main body facing toward the carrier body and toward the carrier body, and the second locking portion is connected to an outer periphery of the ring-shaped structure.

According to an embodiment of the present invention, preferably, a third locking portion protrudes from an inner periphery of the ring-shaped structure toward an interior of the ring-shaped structure. At least two third locking slots are formed on the carrier body and for engaging with the third locking portion, and when the second locking portion slides to engage with one of the at least two second locking slots, the third locking portion slides to engage with a corresponding one of the at least two third locking slots synchronously along with the second locking portion.

According to an embodiment of the present invention, preferably, a protrusion protrudes from the carrier body toward the interior of the ring-shaped structure, and the at least two third locking slots are formed on the protrusion.

According to an embodiment of the present invention, preferably, the second locking slot and the third locking slot are respectively located at circumferences of two circles with a same center but different diameters.

According to an embodiment of the present invention, preferably, the second locking portion and the third locking portion protrude along a same direction.

According to an embodiment of the present invention, preferably, a limiting hole is formed on the main body and for restraining a sliding movement of the locking component.

According to an embodiment of the present invention, preferably, the limiting hole is a elongated hole.

Furthermore, the present invention further discloses a child carrier. The child carrier includes a carrier body, a handle and at least one handle adjusting mechanism. The handle is pivotally connected to the carrier body. The at least one handle adjusting mechanism includes a locking component slidably disposed at a pivotal connection of the handle and the carrier body. The locking component includes a first locking portion and a second locking portion. The first locking portion is for engaging with the handle. The second locking portion is for engaging with the carrier body. The handle is restrained from pivoting relative to the carrier body when the locking component slides to an engaging position to engage the first locking portion with the handle and to engage the second locking portion with carrier body, and the handle is allowed to pivot relative to the carrier body when the locking component slides to a disengaging position to disengage the first locking portion from the handle and to disengage the second locking portion from the carrier body.

According to an embodiment of the present invention, preferably, the carrier body is a child basket, a child safety seat, a child stroller, a child crib or a child cradle.

In summary, the present invention utilizes the first locking portion and the second locking portion of the locking component to synchronously and respectively engage with or disengage from the handle and the carrier body, which can not only make structure compact, but also provide a torque for restraining the handle from pivoting relative to the carrier body to firmly position the handle relative to the carrier body when the locking component is located at the engaging position. Furthermore, the torque provided by the configuration of the first locking portion and the second locking portion can balance a shear stress caused by a biased pivotal movement of the handle relative to the carrier body when the locking component is located at the engaging position, which prevents damage of the locking component due to accidental shaking of the handle or the carrier body which occurs in the prior art due to engagement of the handle and the carrier body with a same portion. Besides, when the handle pivots relative to the carrier body at different angles, the locking component can slide to engage the first locking portion with the handle and to engage the second locking portion with the carrier body for positioning the handle relative to the carrier body. Since the present invention has simple structure and capability of positioning the handle relative to the carrier body, the present invention has better applicability and can be widely used in different applications.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "couple" is intended to mean either an indirect or direct electrical/mechanical connection. Thus, if a first device is coupled to a second device, that connection may be through a direct electrical/mechanical connection, or through an indirect electrical/mechanical connection via other devices and connections.

Figure 1:
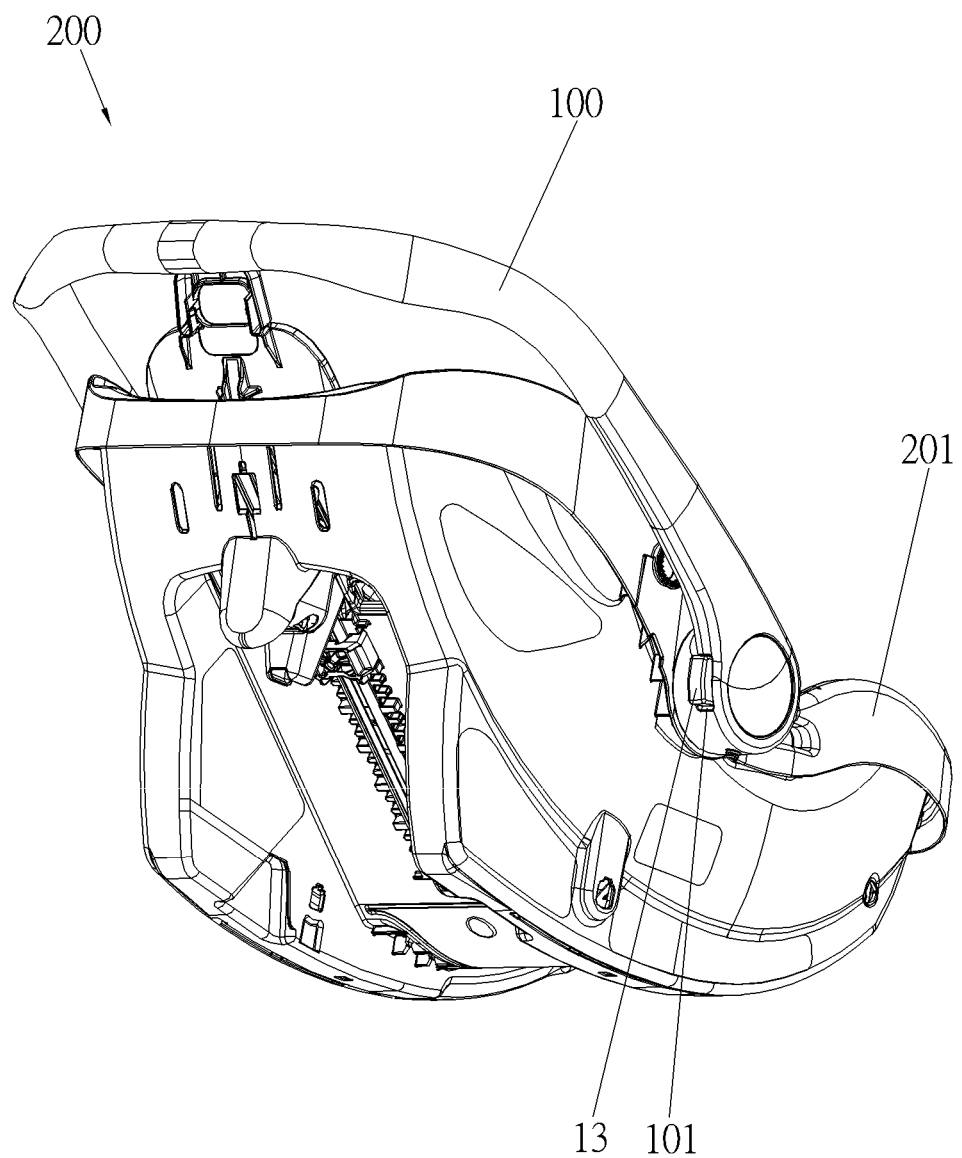
FIG. 1 and FIG. 2 are schematic diagrams of a child carrier in different states according to an embodiment of the present invention.
Figure 2:
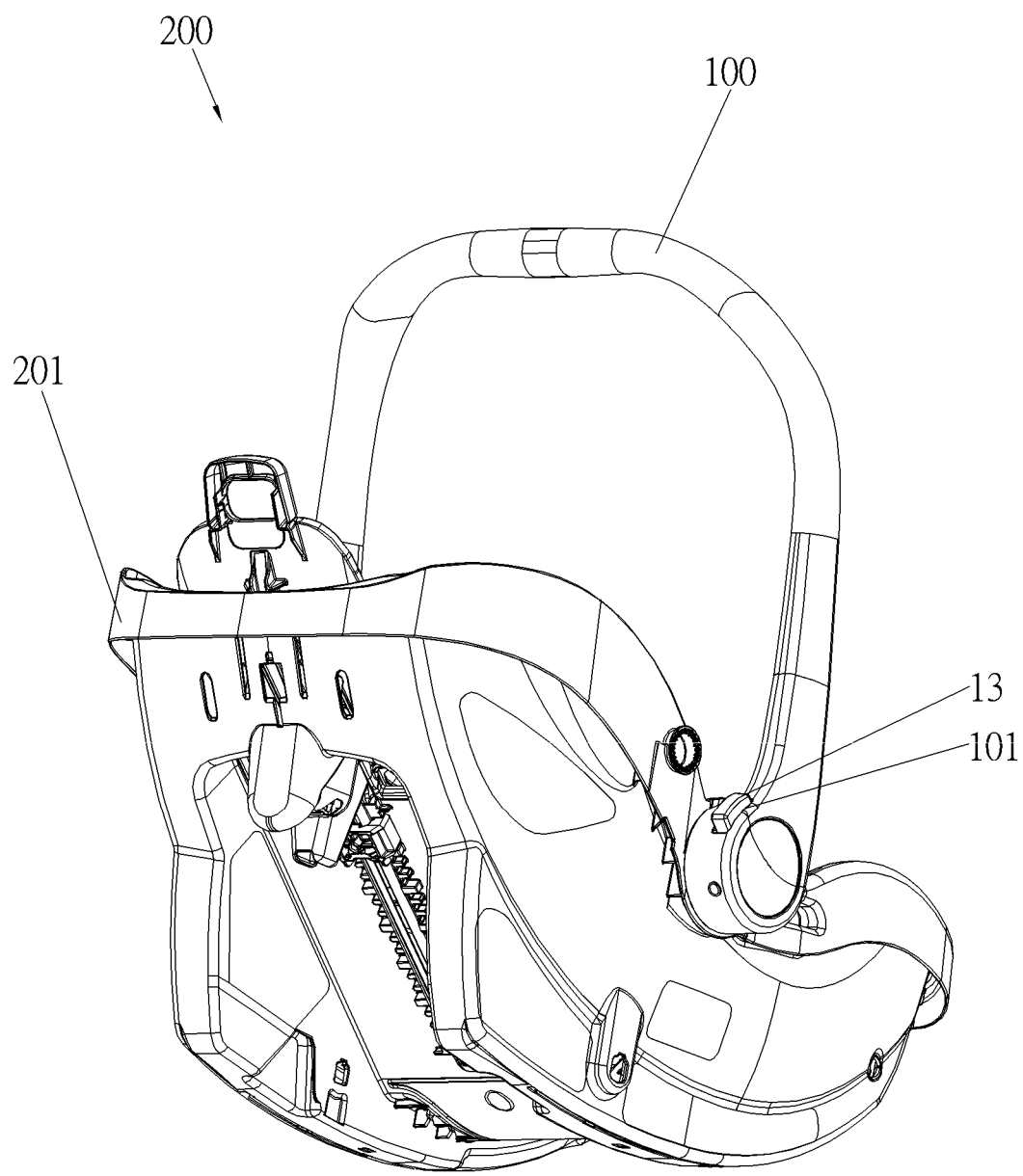

Please refer to FIG. 1 and FIG. 2. FIG. 1 and FIG. 2 are schematic diagrams of a child carrier 200 in different states according to an embodiment of the present invention. As shown in FIG. 1 and FIG. 2, the child carrier 200 includes a carrier body 201 and a handle 100 pivotally connected to the carrier body 201. Specifically, in this embodiment, the handle 100 can be formed in a U-shaped structure, and two ends of the handle 100 are pivoted to two lateral sides of the carrier body 201. The handle 100 is for allowing a user to hold to move the entire child carrier 200 easily. In order to position the handle 100 relative to the carrier body 201 at different angles, e.g., to position the handle 100 at a first angle as shown in FIG. 1 or a second angle as shown in FIG. 2, the child carrier 200 further includes at least one handle adjusting mechanism disposed on at least one of the two pivotal connections of the handle 100 and the carrier body 201 for allowing an angle adjustment of the handle 100 relative to the carrier body 201. Specifically, in this embodiment, the child carrier 200 includes two handle adjusting mechanisms respectively located at the two pivotal connections of the handle 100 and the carrier body 201. However, the present invention is not limited to this embodiment. For example, in another embodiment, the child carrier can include only one handle adjusting mechanism disposed at one of the two pivotal connections of the handle and the carrier body.

Specifically, as shown in FIG. 1 and FIG. 2, the child carrier 201 can be a child basket which can be installed on a vehicle seat, a stroller frame, or any other device which can provide mobility and support for the child carrier 201. However, the present invention is not limited to this embodiment. For example, in another embodiment, the child carrier can be a child safety seat, a child stroller, a child crib or a child cradle.

Figure 3:
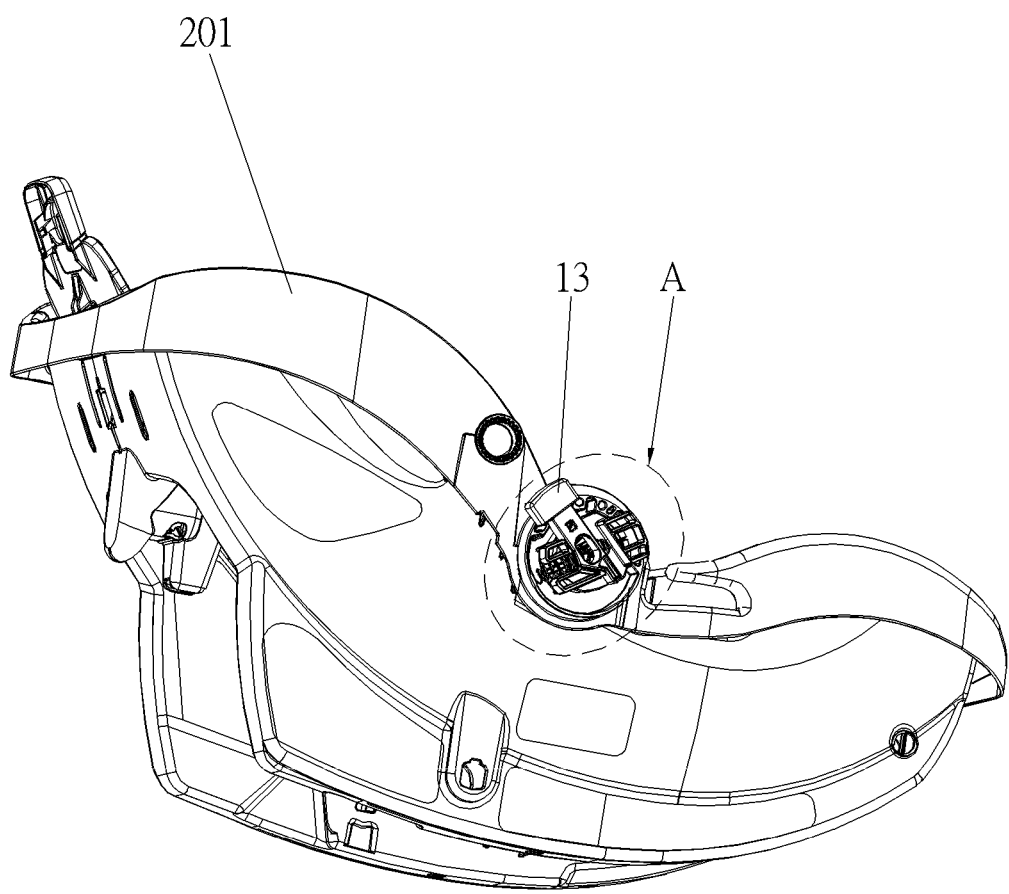
FIG. 3 is a partial diagram of the child carrier according to the embodiment of the present invention.
Figure 4:
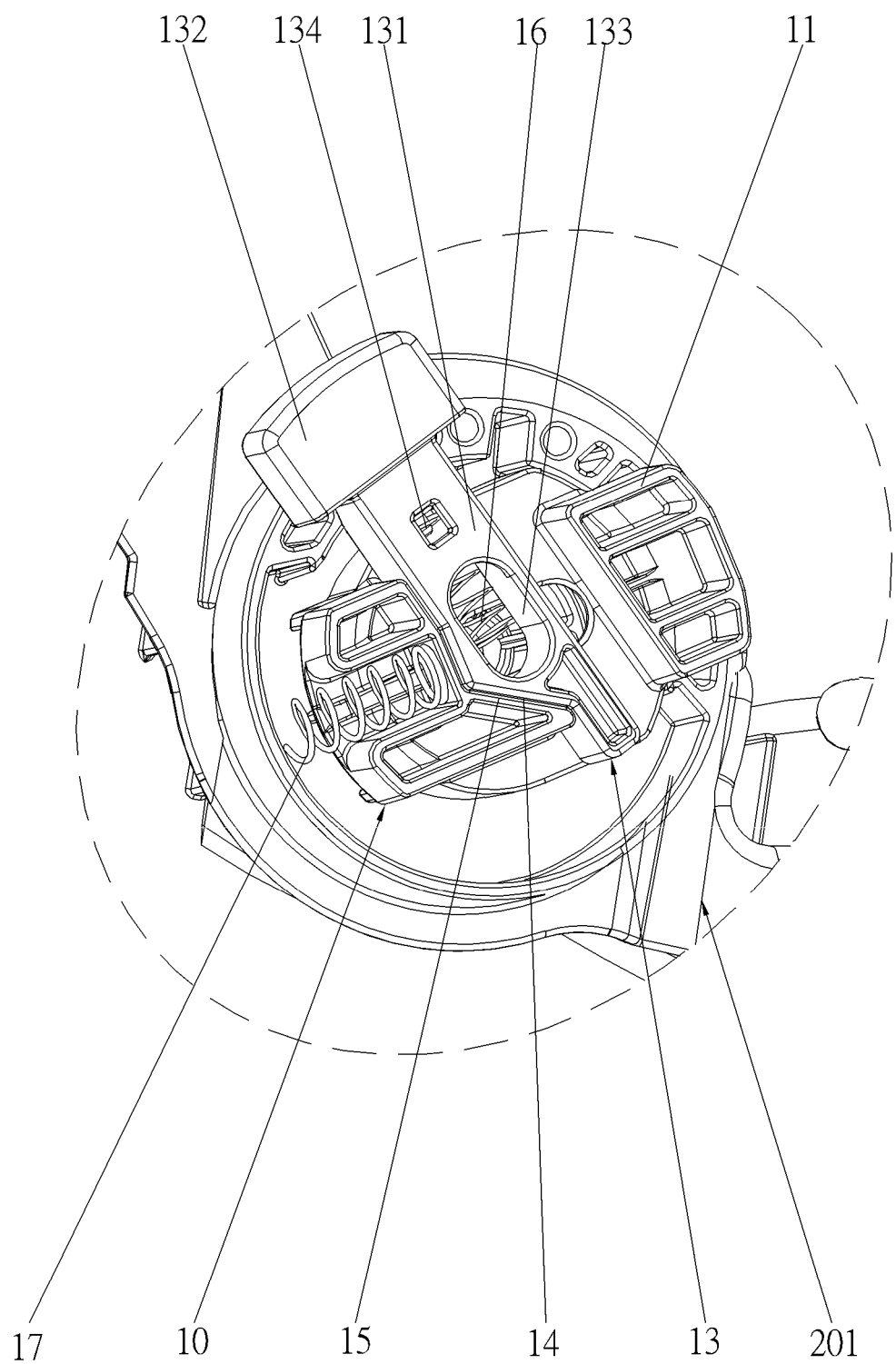
FIG. 4 is an enlarged diagram of an A portion of the child carrier shown in FIG. 3 according to the embodiment of the present invention.
Figure 5:
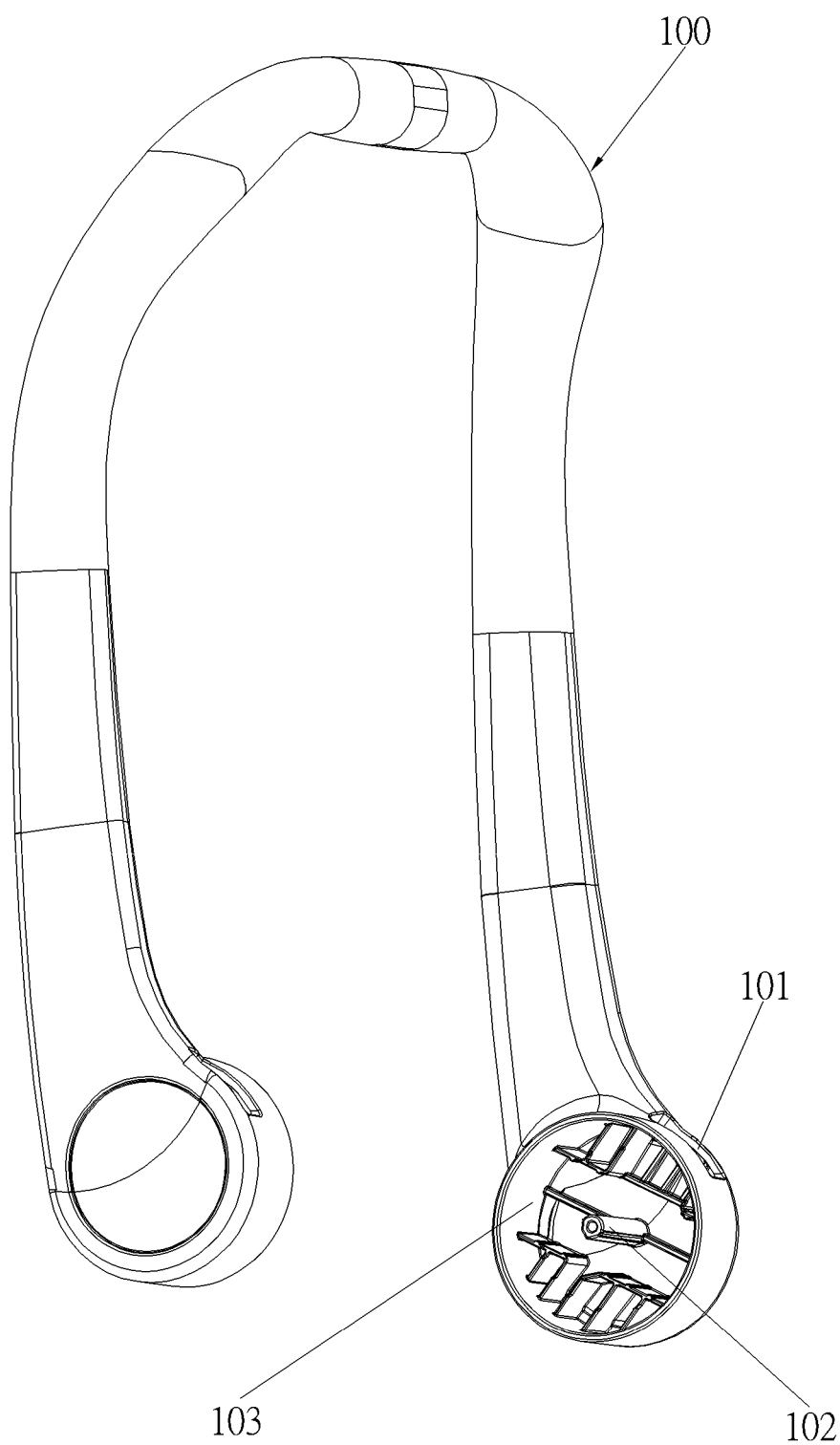
FIG. 5 is a diagram of a handle according to the embodiment of the present invention.
Figure 6:
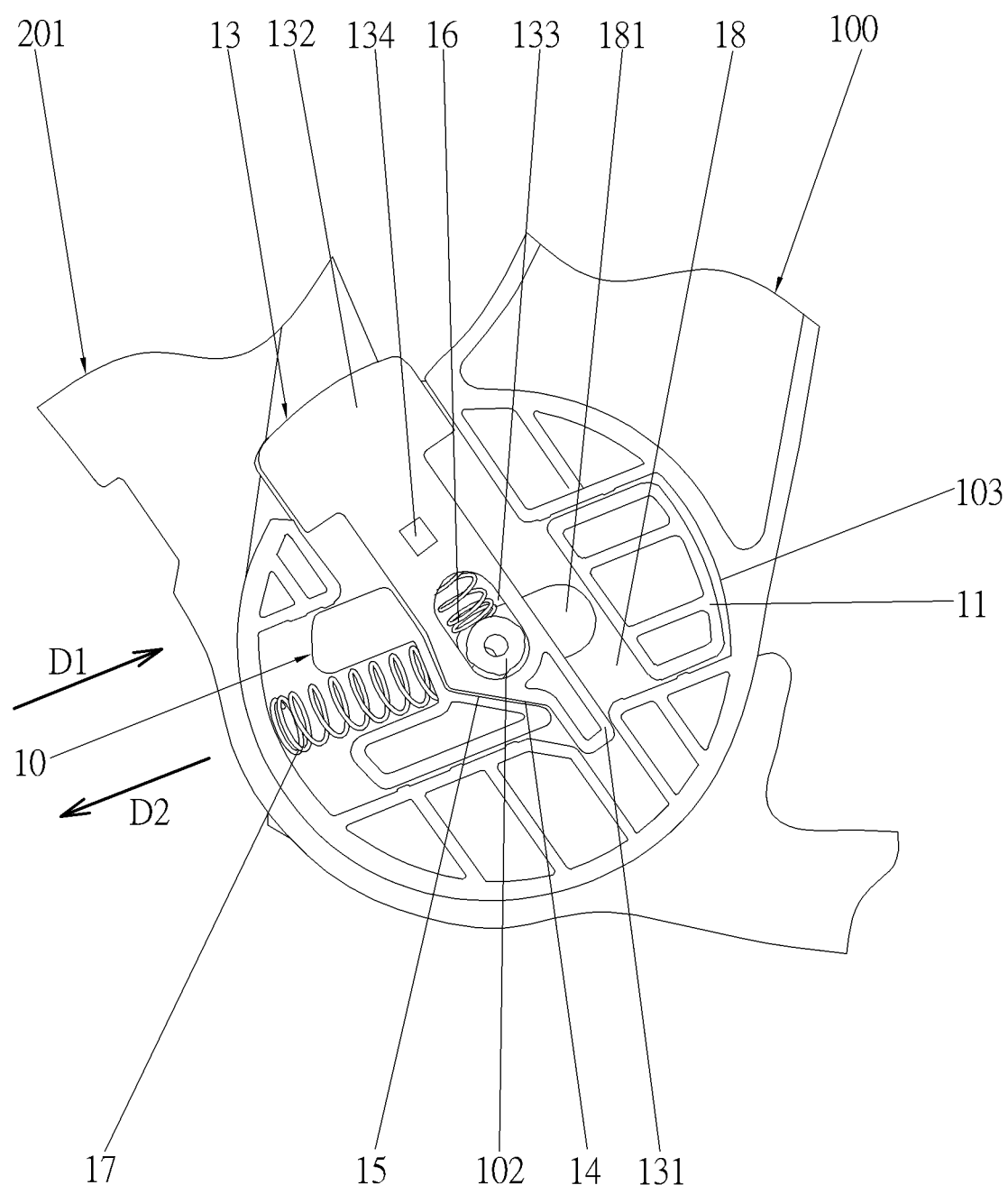
FIG. 6 and FIG. 7 are partial sectional diagrams of the child carrier at different views according to the embodiment of the present invention.
Figure 7:
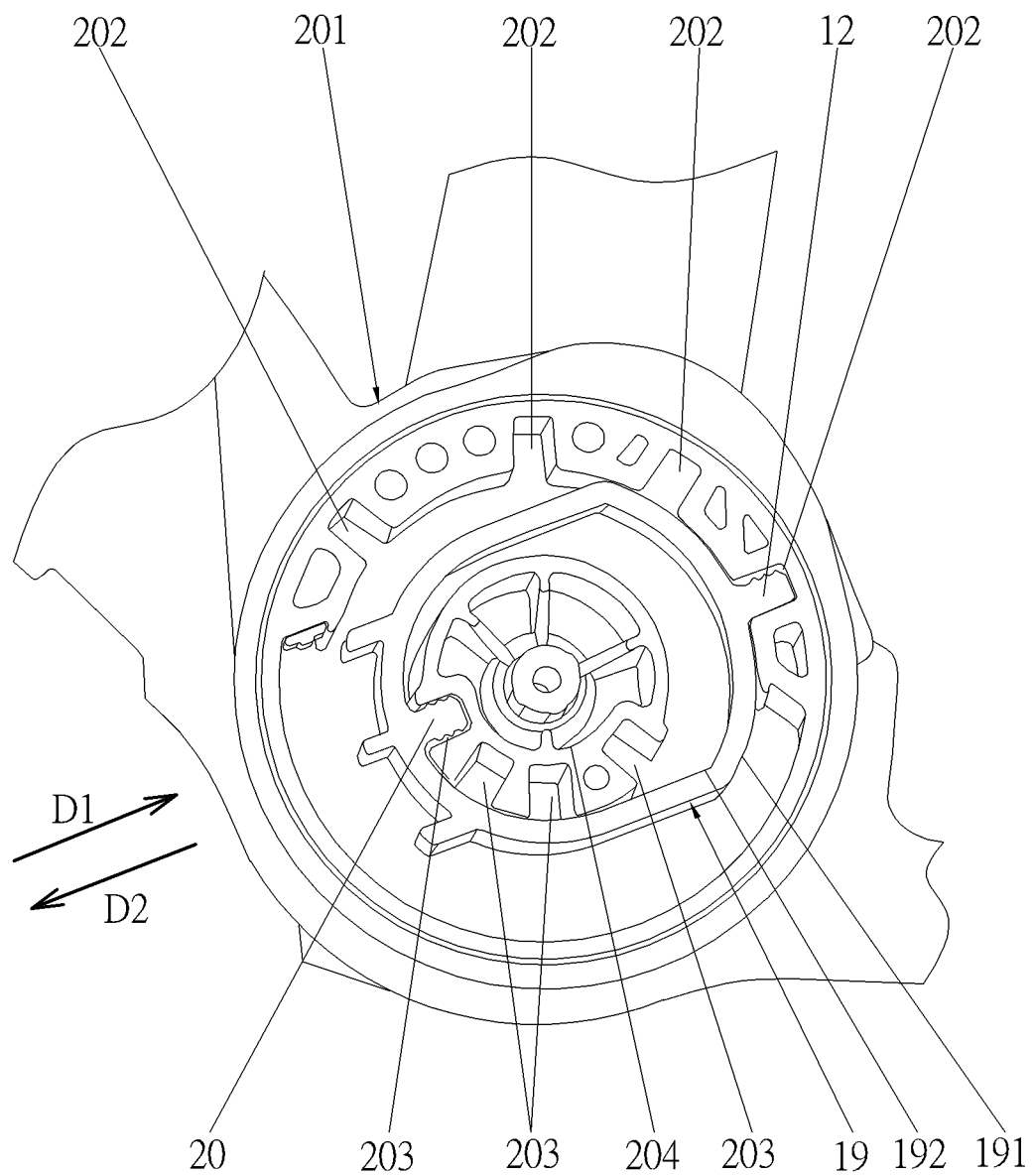
Figure 8:
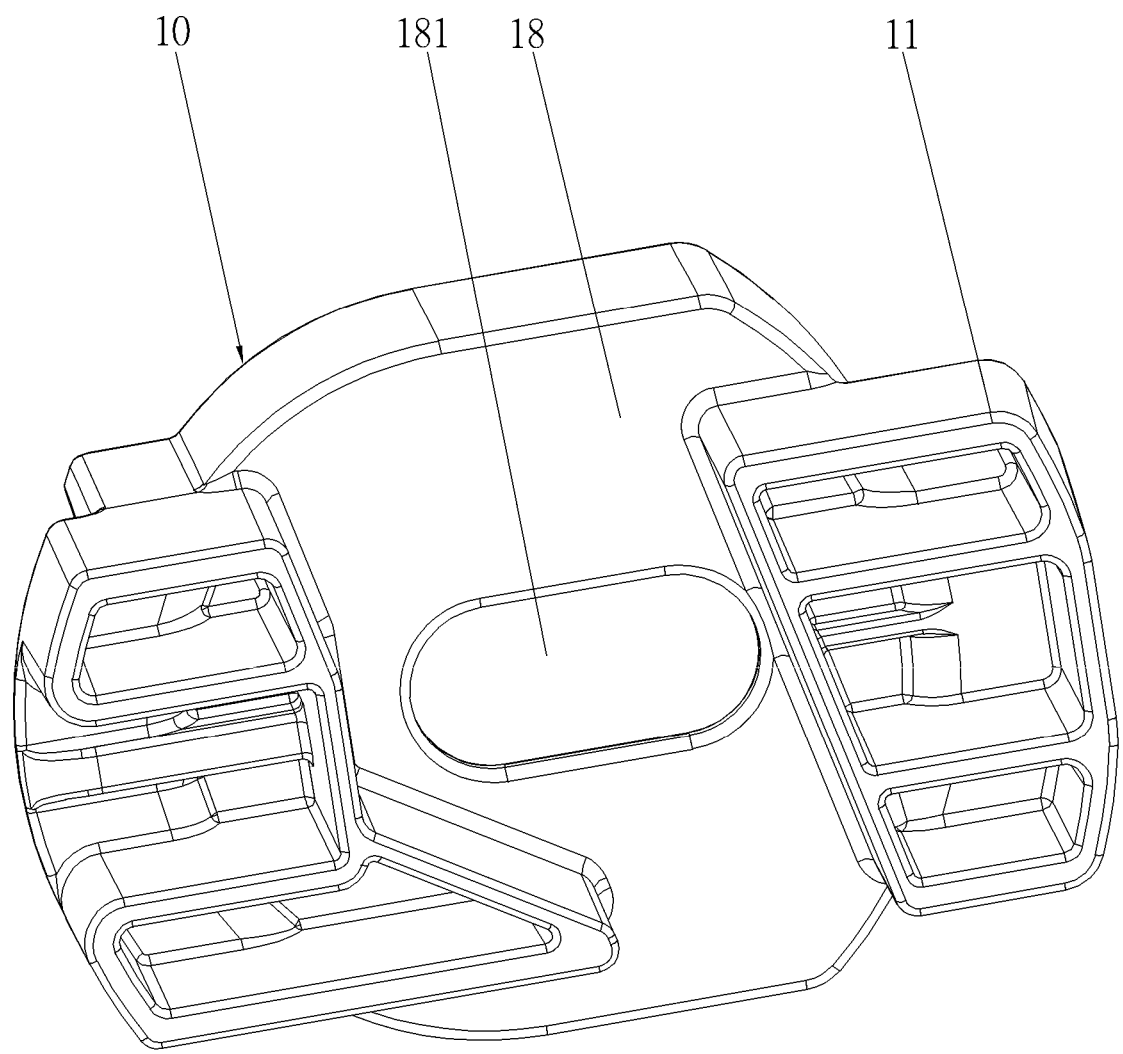
FIG. 8 and FIG. 9 are diagrams of a locking component at different views according to the embodiment of the present invention.
Figure 9:
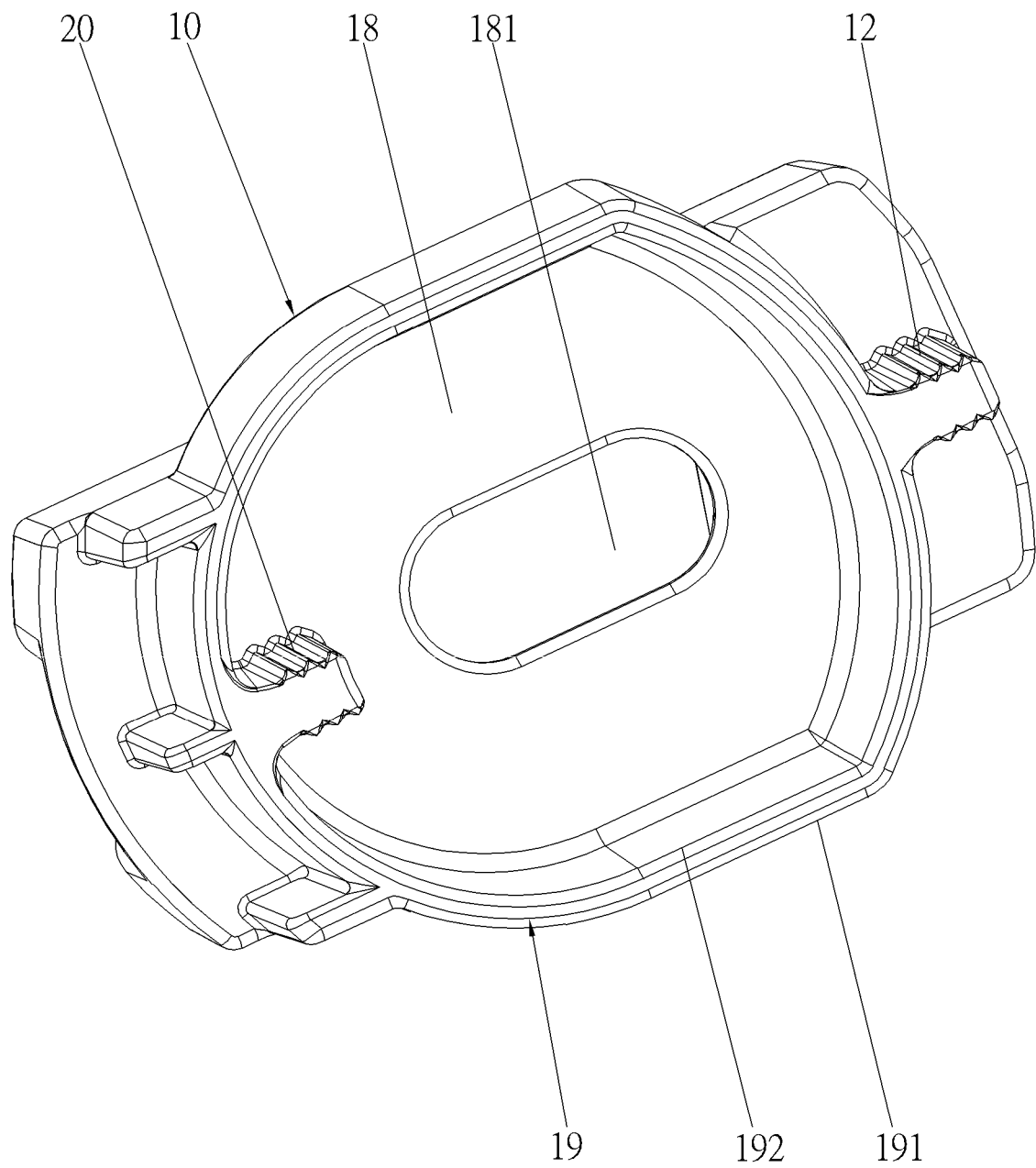

Please refer to FIG. 1 to FIG. 9. FIG. 3 is a partial diagram of the child carrier 200 according to the embodiment of the present invention. FIG. 4 is an enlarged diagram of an A portion of the child carrier 200 shown in FIG. 3 according to the embodiment of the present invention. FIG. 5 is a diagram of the handle 100 according to the embodiment of the present invention. FIG. 6 and FIG. 7 are partial sectional diagrams of the child carrier 200 at different views according to the embodiment of the present invention. FIG. 8 and FIG. 9 are diagrams of a locking component 10 at different views according to the embodiment of the present invention. The two handle adjusting mechanisms are located at two sides symmetrically to each other. Detailed description for the structure of the handle adjusting mechanism at one side is provided as follows.

As shown in FIG. 1 to FIG. 7, the handle adjusting mechanism is for retraining or allowing pivotal movement of the handle 100 relative to the carrier body 201. The handle adjusting mechanism includes a locking component 10 slidably disposed at the corresponding pivotal connection of the handle 100 and the carrier body 201. The locking component 10 includes a first locking portion 11 and a second locking portion 12. The first locking portion 11 is for engaging with the handle 100, and the second locking portion 12 is for engaging with the carrier body 201. The locking component 10 can slide to an engaging position along a first sliding direction D1 to engage the first locking portion 11 with the handle 100 along the first sliding direction D1 and to engage the second locking portion 12 with the carrier body 201 along the first sliding direction D1 synchronously for restraining the pivotal movement of the handle 100 relative to the carrier body 201. The locking component 10 also can slide to a disengaging position along a second sliding direction D2 opposite to the first sliding direction D1 to disengage the first locking portion 11 from the handle 100 along the second sliding direction D2 and to disengage the second locking portion 12 from the carrier body 201 along the second sliding direction D2 synchronously for allowing the pivotal movement of the handle 100 relative to the carrier body 201, so that the handle 100 can be positioned relative to the carrier body 201 at different angles, i.e., an angle of the handle 100 relative to the carrier body 201 is adjustable. The first locking portion 11 and the second locking portion 12 can be two different portions of the locking component 10, and the locking component 10 can be a one-piece structure. Therefore, the pivotal movement of the handle 100 relative to the carrier body 201 is restrained only when the locking component 10 is located at the engaging position, i.e., when the first locking portion 11 and the second locking portion 12 synchronously and respectively engage with the handle 100 and the carrier body 201. The pivotal movement of the handle 100 relative to the carrier body 201 is allowed only when the locking component 10 is located at the disengaging position, i.e., when the first locking portion 11 and the second locking portion 12 synchronously and respectively disengage from the handle 100 and the carrier body 201.

The present invention utilizes the first locking portion 11 and the second locking portion 12 of the locking component 10 to synchronously and respectively engage with or disengage from the handle 100 and the carrier body 201, which can not only make structure compact, but also provide a torque for restraining the handle 100 from pivoting relative to the carrier body 201 to firmly position the handle 100 relative to the carrier body 201 when the locking component 10 is located at the engaging position. Furthermore, the torque provided by the configuration of the first locking portion 11 and the second locking portion 12 can balance a shear stress caused by a biased pivotal movement of the handle 100 relative to the carrier body 201 when the locking component 10 is located at the engaging position, which prevents damage of the locking component 10 due to accidental shaking of the handle 100 or the carrier body 201 which occurs in the prior art due to engagement of the handle and the carrier body with a same portion. Besides, when the handle 100 pivots relative to the carrier body 201 at different angles, the locking component 10 can slide to the engaging position to engage the first locking portion 11 with the handle 100 and to engage the second locking portion 12 with the carrier body 201 for positioning the handle 100 relative to the carrier body 201.

As shown in FIG. 1 to FIG. 4 and FIG. 6, in order to drive the locking component 10 to slide, the handle adjusting mechanism further includes an operating component 13 slidably disposed at the corresponding pivotal connection of the handle 100 and the carrier body 201. The operating component 13 is for abutting against the locking component 10 to drive the locking component 10 to slide. In this embodiment, when the operating component 13 is operated to slide, the sliding operating component 13 abuts against the locking component 10 to slide to the disengaging position to disengage the first locking portion 11 from the handle 100 and to disengage the second locking portion 12 from the carrier body 201.

Preferably, a first inclined surface 14 is formed on the operating component 13, and a second inclined surface 15 is formed on the locking component 10 and for cooperating with the first inclined surface 14. The operating component 13 is operated to slide to drive the locking component 10 to slide from the engaging position to the disengaging position by cooperation of the first inclined surface 14 and the second inclined surface 15, so as to allow the pivotal movement of the handle 100 relative to the carrier body 201. The configuration of the first inclined surface 14 and the second inclined surface 15 which can change a direction of force transmission not only allows the operating component 13 to drive the locking component 10 to slide effectively but also makes the structure more compact.

However, the present invention is not limited to this embodiment. For example, in another embodiment, the operating component can be configured to drive the locking component to slide from the disengaging position to the engaging position by two inclined surfaces different from the first inclined surface and the second inclined surface when the operating component is operated. Alternatively, in another embodiment, the operating component can be configured to drive the locking component to slide between the disengaging position and the engaging position by the first inclined surface, the second inclined surface and the two inclined surfaces different from the first inclined surface and the second inclined surface when the operating component is operated to slide along opposite directions.

As shown in FIG. 1 to FIG. 4 and FIG. 6, in order to enhance operability of the operating component 13, an abutting end 131 of the operating component 13 is located inside the pivotal connection of the handle 100 and the carrier body 201 and for abutting against the locking component 10, and an operating end 132 of the operating component 13 protrudes out of the corresponding pivotal connection of the handle 100 and the carrier body 201 for allowing the user to operate the operating component 13 by pressing the operating end 132 easily. Specifically, the first inclined surface 14 is formed on the abutting end 131 of the operating component 13 and for abutting against the second inclined surface 15 formed on the locking component 10. In this embodiment, the first inclined surface 14 can be configured to abut against the second inclined surface 15 when the operating component 13 released, so that the operating component 13 can drive the locking component 10 by abutment of the first inclined surface 14 and the second inclined surface 15 once the operating component 13 is operated to slide. However, the present invention is not limited to this embodiment. For example, in another embodiment, the first inclined surface 14 can be configured to be separated from the second inclined surface 15 when the operating component 13 is released, so that the operating component 13 cannot drive the locking component 10 until the operating component 13 is operated to slide by a predetermined distance to drive the first inclined surface 14 to abut against the second inclined surface 15.

As shown in FIG. 5 and FIG. 6, preferably, the operating component 13 is slidably disposed through an opening 101 formed on the handle 100, and the operating component 13 and the locking component 10 pivot relative to the carrier body 201 along with the pivotal movement of the handle 100 relative to the carrier body 201.

As shown in FIG. 4 to FIG. 6, preferably, the operating component 13 is biased to slide away from the locking component 10. Specifically, the handle adjusting mechanism further includes a resilient component 16 compressibly disposed at the corresponding pivotal connection of the handle 100 and the carrier body 201 and abutting against the operating component 13. The operating component 13 is biased to slide away from the locking component 10 by the resilient component 16. The resilient component 16 biasing the operating component 13 to slide away from the locking component 10 not only prevents the locking component 10 from being driven to slide by the operating component 13 when the operating component 13 is released, but also allows the locking component 10 to slide to the engaging position when the operating component 13 is released after the angle adjustment of the handle 100 relative to the carrier body 201.

As shown in FIG. 4 to FIG. 7, a pivoting shaft 102 protrudes from the handle 100 and is pivoted to the carrier body 201. Specifically, a restraining hole 133 is formed on the operating component 13. The pivoting shaft 102 passes through the restraining hole 133, and a sliding movement of the operating component 13 is restrained by cooperation of the pivoting shaft 102 and the restraining hole 133. Furthermore, an installing hole 134 is formed on the operating component 13 and communicated with the restraining hole 133. The resilient component 16 is compressibly disposed inside the installing hole 134 and the restraining hole 133. Two ends of the resilient component 16 respectively abut against the pivoting shaft 102 and a wall of the installing hole 134. More specifically, the restraining hole 133 is a elongated hole.

As shown in FIG. 4 and FIG. 6, the locking component 10 is biased to slide to the engaging position to engage the first locking portion 11 with the handle 100 and to engage the second locking portion 12 with the carrier body 201. Specifically, the handle adjusting mechanism further includes a recovering component 17 compressibly disposed at the corresponding pivotal connection of the handle 100 and the carrier body 201 and abutting against the locking component 10. The locking component 10 is biased to slide to the engaging position by the recovering component 17. The recovering component 17 biasing the locking component 10 to slide to engaging position allows the first locking portion 11 and the second locking portion 12 to respectively engage with the handle 100 and the carrier body 201 for restraining the pivotal movement of the handle 100 relative to the carrier body 201 when the operating component 13 is released.

More specifically, as shown in FIG. 4 and FIG. 6 to FIG. 9, the locking component 10 includes a main body 18. The first locking portion 11 and the second locking portion 12 protrude from the main body 18. A first locking slot 103 is formed on the handle 100 for engaging with the first locking portion 11, and at least two second locking slots 202 are formed on the carrier body 201 for engaging with the second locking portion 12. Specifically, in this embodiment, there are four second locking slots 202 formed on the carrier body 201 for positioning the handle 100 relative to the carrier body 201 at four different angles. However, the number of the second locking slots is not limited to this embodiment. For example, in another embodiment, there can be two second locking slots formed on the carrier body for positioning the handle relative to the carrier body at two different angles. When the second locking portion 12 engages with different ones of the at least two second locking slots 202, the handle 100 can be positioned relative to the carrier body 201 at different angles. When the operating component 13 is released, the recovering component 17 resiliently abuts against the main body 18 to drive the locking component 10 to slide to the engaging position, which prevents the locking component 10 from sliding to the disengaging position and ensures safety of the child carrier 200. Furthermore, when the locking component 10 is driven to slide to the engaging position, the locking component 10 can drive the operating component 13 to recover by cooperation of the second inclined surface 15 and the first inclined surface 14.

As shown in FIG. 6 to FIG. 9, preferably, the first locking portion 11 and the second locking portion 12 protrude from the main body 18 along two opposite directions which are perpendicular to a sliding direction of the locking component 10. Specifically, a ring-shaped structure 19 protrudes from a side of the main body 18 facing toward the carrier body 201 and protrudes toward the carrier body 201, and the second locking portion 12 is connected to an outer periphery 191 of the ring-shaped structure 19. More specifically, in order to firmly position the handle 100 relative to the carrier body 201, a third locking portion 20 protrudes from the main body 18 and is connected to an inner periphery 192 of the ring-shaped structure 19 toward an interior of the ring-shaped structure 19. At least two third locking slots 203 are formed on the carrier body 201 and for engaging with the third locking portion 20. Specifically, in this embodiment, there are four third locking slots 203 formed on the carrier body 201 for positioning the handle 100 relative to the carrier body 201 at four different angles. However, the number of the third locking slots is not limited to this embodiment. For example, in another embodiment, there can be two third locking slots formed on the carrier body for positioning the handle relative to the carrier body at two different angles when there are two second locking slots. When the locking component 10 slides to the engaging position, the second locking portion 12 slides to engage with one of the at least two second locking slots 202, and the third locking portion 20 slides to engage with a corresponding one of the at least two third locking slots 203 synchronously along with the second locking portion 12. Furthermore, a limiting hole 181 is formed on the main body 18 and for restraining a sliding movement of the locking component 10. The pivoting shaft 102 passes through the limiting hole 181. A sliding movement of the locking component 10 is restrained by cooperation of the pivoting shaft 102 and the limiting hole 181. Specifically, the limiting hole 181 is a elongated hole.

As shown in FIG. 6 to FIG. 9, preferably, the first locking portion 11 and the second locking portion 12 protrude from the main body 18 along two opposite directions which are perpendicular to a sliding direction of the locking component 10. Specifically, a ring-shaped structure 19 protrudes from a side of the main body 18 facing toward the carrier body 201 and protrudes toward the carrier body 201, and the second locking portion 12 is connected to an outer periphery 191 of the ring-shaped structure 19. More specifically, in order to firmly position the handle 100 relative to the carrier body 201, a third locking portion 20 protrudes from the main body 18 and is connected to an inner periphery 192 of the ring-shaped structure 19 toward an interior of the ring-shaped structure 19. At least two third locking slots 203 are formed on the carrier body 201 and for engaging with the third locking portion 20. Specifically, in this embodiment, there are four third locking slots 203 formed on the carrier body 201 for positioning the handle 100 relative to the carrier body 201 at four different angles. However, the number of the third locking slots is not limited to this embodiment. For example, in another embodiment, there can be two third locking slots formed on the carrier body for positioning the handle relative to the carrier body at two different angles when there are two second locking slots. When the locking component 10 slides to the engaging position, the second locking portion 12 slides to engage with one of the at least two second locking slots 202, and the third locking portion 20 slides to engage with a corresponding one of the at least two third locking slots 203 synchronously along with the second locking portion 12. Furthermore, a second restraining hole 181 is formed on the main body 18 and for restraining a sliding movement of the locking component 10. The pivoting shaft 102 passes through the second restraining hole 181. A sliding movement of the locking component 10 is restrained by cooperation of the pivoting shaft 102 and the second restraining hole 181. Specifically, the second restraining hole 181 is a waist-shaped hole.

As shown in FIG. 7, preferably, a protrusion 204 protrudes from the carrier body 201 toward the interior of the ring-shaped structure 19, and the at least two third locking slots 203 are formed on the protrusion 204. The configuration of the protrusion 204 and the ring-shaped structure 19 makes the structure more compact. Specifically, the second locking slots 202 and the third locking slots 203 are respectively located at circumferences of two circles with a same center but different diameters.

As shown in FIG. 7 and FIG. 9, preferably, the second locking portion 12 and the third locking portion 20 protrude along the same direction which is opposite to a protruding direction of the first locking portion 11 and perpendicular to the sliding direction of the locking component 10.

In contrast to the prior art, the present invention utilizes the first locking portion and the second locking portion of the locking component to synchronously and respectively engage with or disengage from the handle and the carrier body, which cannot only make structure compact, but also provide a torque for restraining the handle from pivoting relative to the carrier body to firmly position the handle relative to the carrier body when the locking component is located at the engaging position. Furthermore, the torque provided by the configuration of the first locking portion and the second locking portion can balance a shear stress caused by a biased pivotal movement of the handle relative to the carrier body when the locking component is located at the engaging position, which prevents damage of the locking component due to accidental shaking of the handle or the carrier body which occurs in the prior art due to engagement of the handle and the carrier body with a same portion. Besides, when the handle pivots relative to the carrier body at different angles, the locking component can slide to engage the first locking portion with the handle and to engage the second locking portion with the carrier body for positioning the handle relative to the carrier body. Since the present invention has simple structure and capability of positioning the handle relative to the carrier body, the present invention has better applicability and can be widely used in different applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A handle adjusting mechanism for adjusting a handle relative to a carrier body pivotally connected to the handle, the handle adjusting mechanism comprising:

a locking component slidably disposed at a pivotal connection of the handle and the carrier body, the locking component comprising a first locking portion and a second locking portion, a first locking slot being formed on the handle, the first locking portion being for engaging with the handle by engagement of the first locking portion and the first locking slot and disengaging from the handle by disengagement of the first locking portion and the first locking slot, the second locking portion being for engaging with the carrier body, the handle being restrained from pivoting relative to the carrier body when the locking component slides to an engaging position to engage the first locking portion with the handle and to engage the second locking portion with the carrier body, and the handle being allowed to pivot relative to the carrier body when the locking component slides to a disengaging position to disengage the first locking portion from the handle and to disengage the second locking portion from the carrier body; and an operating component slidably disposed at the pivotal connection of the handle and the carrier body and for abutting against the locking component, the operating component sliding to abut against the locking component to drive the locking component to slide to the engaging position or the disengaging position.

2. The handle adjusting mechanism of claim 1, wherein a first inclined surface is formed on the operating component, a second inclined surface is formed on the locking component and for cooperating with the first inclined surface, and the operating component drives the locking component to slide to the engaging position or the disengaging position by cooperation of the first inclined surface and the second inclined surface.

3. The handle adjusting mechanism of claim 1, wherein the locking component is disposed inside the pivotal connection of the handle and the carrier body, the operating component comprises an abutting end and an operating end, the abutting end is located inside the pivotal connection of the handle and the carrier body and for abutting against the locking component, and the operating end protrudes out of the pivotal connection of the handle and the carrier body.

4. The handle adjusting mechanism of claim 1, wherein the operating component and the locking component are slidably disposed on the handle, and the operating component and the locking component pivot relative to the carrier body synchronously along with a pivotal movement of the handle relative to the carrier body.

5. The handle adjusting mechanism of claim 1, wherein the operating component is biased to slide away from the locking component.

6. The handle adjusting mechanism of claim 5, further comprising a resilient component compressibly disposed at the pivotal connection of the handle and the carrier body and abutting against the operating component, and the operating component being biased to slide away from the locking component by the resilient component.

7. The handle adjusting mechanism of claim 1, wherein a pivoting shaft protrudes from the handle and is pivoted to the carrier body.

8. The handle adjusting mechanism of claim 7, wherein a restraining hole is formed on the operating component, the pivoting shaft passes through the restraining hole, and a sliding movement of the operating component is restrained by cooperation of the pivoting shaft and the restraining hole.

9. The handle adjusting mechanism of claim 8, wherein an installing hole is formed on the operating component and communicated with the restraining hole.

10. The handle adjusting mechanism of claim 9, wherein the restraining hole is an elongated hole.

11. The handle adjusting mechanism of claim 1, wherein the locking component is biased to slide to the engaging position.

12. The handle adjusting mechanism of claim 1, further comprising a recovering component compressibly disposed at the pivotal connection of the handle and the carrier body and abutting against the locking component, and the locking component being biased to slide to the engaging position by the recovering component.

13. The handle adjusting mechanism of claim 1, wherein the locking component further comprises a main body, the first locking portion protrudes from the main body.

14. The handle adjusting mechanism of claim 13, wherein the second locking portion protrudes from the main body, at least two second locking slots are formed on the carrier body and for engaging with the second locking portion, and the handle is positioned relative to the carrier body at different angles when the second locking portion slides to engage with different ones of the at least two second locking slots.

15. The handle adjusting mechanism of claim 14, wherein the first locking portion and the second locking portion protrude from the main body along two opposite directions.

16. The handle adjusting mechanism of claim 15, wherein a ring-shaped structure protrudes from a side of the main body facing toward the carrier body and toward the carrier body, and the second locking portion is connected to an outer periphery of the ring-shaped structure.

17. The handle adjusting mechanism of claim 16, wherein a third locking portion protrudes from the main body and is connected to an inner periphery of the ring-shaped structure toward an interior of the ring-shaped structure, at least two third locking slots are formed on the carrier body and for engaging with the third locking portion, and when the second locking portion slides to engage with one of the at least two second locking slots, the third locking portion slides to engage with a corresponding one of the at least two third locking slots synchronously along with the second locking portion.

18. The handle adjusting mechanism of claim 17, wherein a protrusion protrudes from the carrier body toward the interior of the ring-shaped structure, and the at least two third locking slots are formed on the protrusion.

19. The handle adjusting mechanism of claim 17, wherein the at least two second locking slots and the at least two third locking slots are respectively located at circumferences of two circles with a same center but different diameters.

20. The handle adjusting mechanism of claim 17, wherein the second locking portion and the third locking portion protrude along a same direction.

21. The handle adjusting mechanism of claim 13, wherein a limiting hole is formed on the main body and for restraining a sliding movement of the locking component.

22. The handle adjusting mechanism of claim 21, wherein the limiting hole is an elongated hole.

23. A child carrier comprising:
a carrier body;
a handle pivotally connected to the carrier body; and
at least one handle adjusting mechanism comprising:
a locking component slidably disposed at a pivotal connection of the handle and the carrier body, the locking component comprising a first locking portion and a second locking portion, a first locking slot being formed on the handle, the first locking portion being for engaging with the handle by engagement of the first locking portion and the first locking slot and disengaging from the handle by disengagement of the first locking portion and the first locking slot, the second locking portion being for engaging with the carrier body, the handle being restrained from pivoting relative to the carrier body when the locking component slides to an engaging position to engage the first locking portion with the handle and to engage the second locking portion with carrier body, and the handle being allowed to pivot relative to the carrier body when the locking component slides to a disengaging position to disengage the first locking portion from the handle and to disengage the second locking portion from the carrier body; and an operating component slidably disposed at the pivotal connection of the handle and the carrier body and for abutting against the locking component, the operating component sliding to abut against the locking component to drive the locking component to slide to the engaging position or the disengaging position.

24. The child carrier of claim 23, wherein the carrier body is a child basket, a child safety seat, a child stroller, a child crib or a child cradle.

\* \* \* \* \*